(12) United States Patent
Kiamilev et al.

(10) Patent No.: US 8,093,872 B2
(45) Date of Patent: Jan. 10, 2012

(54) METHOD FOR MAXIMUM POWER POINT TRACKING OF PHOTOVOLTAIC CELLS BY POWER CONVERTERS AND POWER COMBINERS

(75) Inventors: Fouad Kiamilev, Hockessin, DE (US); Nicholas Andrew Waite, Nassau, DE (US)

(73) Assignee: University of Delaware, Newark, DE (US)

( * ) Notice: Subject to any disclaimer, the term of this patent is extended or adjusted under 35 U.S.C. 154(b) by 135 days.

(21) Appl. No.: 12/496,941

(22) Filed: Jul. 2, 2009

(65) Prior Publication Data

US 2010/0002470 A1 Jan. 7, 2010

Related U.S. Application Data

(60) Provisional application No. 61/133,979, filed on Jul. 3, 2008.

(51) Int. Cl.
*G05F 1/00* (2006.01)
(52) U.S. Cl. ........................................... 323/222
(58) Field of Classification Search .................. 323/222; 136/293
See application file for complete search history.

(56) References Cited

U.S. PATENT DOCUMENTS

| | | | | |
|---|---|---|---|---|
| 5,327,071 A * | 7/1994 | Frederick et al. | ............. | 323/906 |
| 5,530,335 A * | 6/1996 | Decker et al. | ................. | 136/293 |
| 6,204,645 B1 * | 3/2001 | Cullen | ........................... | 323/223 |
| 7,081,739 B2 * | 7/2006 | Osinga et al. | ................. | 323/222 |
| 2002/0163323 A1 * | 11/2002 | Kasai et al. | .................... | 323/284 |
| 2005/0252546 A1 * | 11/2005 | Sasaki | ........................... | 136/293 |
| 2006/0174939 A1 * | 8/2006 | Matan | ........................... | 136/293 |
| 2007/0137688 A1 * | 6/2007 | Yoshida | ........................ | 136/293 |

OTHER PUBLICATIONS

Meinhardt et al., Multi-String-Converter with Reduced Stecific Costs . . . , Pergamon, Solar Energy, vol. 69(Supp. 1) Nos. 1-6, pp. 217-227, 2000.
Kimball et al., Issues with Low-Input-voltage Boost Converter Design, Aache, 35thAnnual IEEE Power Electronics Specialists Conference, pp. 2152-2156, 2004.
Esran et al., Comparison of Photovoltaic Array . . . , IEEE Transaction on Energy Conversion, vol. 22, Issue 2, 439-449, 2007.
Co-pending application in PCT/US2008/007334 filed on Jun. 12, 2008.
International Search Report for PCT/US20081007334 dated Dec. 3, 2008.
Co-pending U.S. Appl. No. 60/934,334 dated Jun. 13, 2007.
Co-pending U.S. Appl. No. 61/133,979 dated Jul. 3, 2008.
International Search Report for PCT/US2009/049480.
Co-pending U.S. Appl. No. 12/959,875 dated Dec. 3, 2010.
Non-Final Office Action in U.S. Appl. No. 12/959,875 dated Mar. 18, 2011.
Restriction Requirement in U.S. Appl. No. 12/959,875 dated Feb. 8, 2011.

* cited by examiner

*Primary Examiner* — Jue Zhang
(74) *Attorney, Agent, or Firm* — Potter Anderson & Corroon LLP; Travis W. Bliss

(57) ABSTRACT

This invention relates to a method for Maximum Power Point Tracking (MPPT) a photovoltaic cell by a power converter that provides an output current at voltages useful to operate electronics or charge batteries. This invention also relates to a method for Maximum Power Point Tracking (MPPT) multiple photovoltaic cells by a power combiner that combines the output of the multiple photovoltaic cells into a single output. The power combiner is comprised of multiple power converters, one for each photovoltaic cell. Each power converter used in these methods has an input-regulating element that has an output wave form with a characteristic that is related to the photovoltaic cell voltage and current. As a result only the photovoltaic cell voltage is directly measured in these methods and the photovoltaic cell current is determined indirectly.

18 Claims, 4 Drawing Sheets

US 8,093,872 B2

METHOD FOR MAXIMUM POWER POINT TRACKING OF PHOTOVOLTAIC CELLS BY POWER CONVERTERS AND POWER COMBINERS

CROSS REFERENCE TO RELATED APPLICATIONS

This application claims the benefit of U.S. Provisional Application Ser. No. 61/133,979 filed on Jul. 3, 2008 which is hereby incorporated by reference.

This invention was made with Government support under Agreement W911NF-05-9-0005 awarded by the Government. The Government has certain rights in the invention.

FIELD OF THE INVENTION

This invention relates to a method for solar cell Maximum Power Point Tracking (MPPT) by power converters and by power combiners.

BACKGROUND OF THE INVENTION

Small power sources such as photovoltaic cells, and in particular solar cells, are being used to power portable devices or to charge a battery pack. The well-known boost chopper power converter circuit has been used in conjunction with such power sources in portable applications. This type of power converter takes input current at a low voltage, e.g., a single silicon solar cell has an output of about 0.5 volts, and produces an output current at a higher voltage that can be used to operate handheld electronics or charge a battery pack.

When it is desired to use the power of multiple power sources the outputs of the individual sources have to be combined. Traditionally, the power sources such as like-type silicon solar cells have been connected in some series-parallel combination to provide the voltage and current outputs required for the particular application. For example, one type of solar cell battery charger connects the solar cells in series to approximate the battery voltage. The output is then fed into the battery through a diode. However, this architecture is inefficient and the rechargeable batteries quickly wear out. Another approach simulates the AC outlet that users can plug into with a solar cell powered equivalent. This architecture is inherently inefficient since the battery chargers incorporated in most consumer electronics are not designed for efficient operation with limited sources of power.

A photovoltaic cell connected to an electrical load such as a resistor acts as a power-limited current source. Its current output depends on the rate of incident radiation and the temperature of the cell. A typical plot of cell current versus cell voltage for a photovoltaic cell is shown in FIG. 1.for five different incident radiations. Curve A corresponds to an incident radiation of 1000 W/m$^2$, curve B—800 W/m$^2$, curve C—600 W/m$^2$, curve D—400 W/m$^2$ and curve E—200 W/m$^2$. These curves clearly show that cell current depends on the degree of incident radiation. The cell output current collapses if the load attempts to draw too much power from the cell. A typical plot of output power versus cell voltage for a photovoltaic cell is shown in FIG. 2 for the same five different incident radiations used in FIG. 1. Curve A corresponds to an incident radiation of 1000 W/m$^2$, curve B—800 W/m$^2$, curve C—600 W/m$^2$, curve D—400 W/m$^2$ and curve E—200 W/m$^2$. There is a specific operating point, the maximum power point, MPP, with a specific voltage, $V_{MPP}$, and current, $I_{MPP}$, at which maximum power output is produced from the cell. As apparent from FIG. 2, the MPP is a function of the incident radiation. The MPP is also a function of the cell temperature.

It is most efficient, and therefore highly desirable to use Maximum Power Point Tracking (MPPT), i.e., to operate a photovoltaic cell at its MPP. This means finding and tracking the $V_{MPP}$ and $I_{MPP}$. It is even more challenging to accomplish MPPT for a photovoltaic array made up of many solar cells that operate under slightly different temperature and irradiance conditions. Two sensors are usually required to measure photovoltaic cell voltage and photovoltaic cell current. Current sensors are typically more expensive and bulky than voltage sensors.

To obtain maximum power from a photovoltaic array of solar cells, one has to perform MPPT on every solar cell. The number of sensors and hardware complexity required to run MPPT on every solar cell in the array is prohibitively expensive. Instead, MPPT is usually performed on one solar cell or on one group of connected solar cells in the array and the results applied to the whole array.

Recent solar cell architectures use multiple cells that efficiently absorb different portions of the solar spectrum and thereby achieve higher overall conversion efficiency than traditional solar cells using a single type of cell. Since the cells and their characteristics are not identical, to obtain maximum power from such a solar cell architecture MPPT must be carried out for each cell.

Thus there is a continuing need for a method for MPPT a photovoltaic cell, an array of photovoltaic cells and an architecture of different type photovoltaic cells.

SUMMARY OF THE INVENTION

This invention provides a method for Maximum Power Point Tracking (MPPT) a photovoltaic cell by a power converter that converts the power provided by the photovoltaic cell and provides an output current at an output voltage that is greater than and not dependent on the input voltage, the method comprising:
 (a) connecting the photovoltaic cell to a power converter containing an input-regulating element that has an output wave form with a characteristic that is related to the photovoltaic cell voltage and current and determining the relationship between the characteristic of the output wave form and the photovoltaic cell voltage and current;
 (b) directly measuring the photovoltaic cell voltage;
 (c) using the photovoltaic cell voltage measured in step (b) and the relationship between the characteristic of the output wave form of the input-regulating element and the photovoltaic cell voltage and current to determine the photovoltaic cell current;
 (d) using the photovoltaic cell voltage measured in step (b) and the photovoltaic cell current determined in step (c) in a MPPT algorithm to determine the voltage at which the input-regulating element should operate the photovoltaic cell to achieve MPPT; and
 (e) adjusting the voltage at which the input-regulating element is operating the photovoltaic cell to the level determined in step (d).
Preferably, the method further comprises:
 (f) repeating steps (b) through (e) to maintain MPPT during the operation of the photovoltaic cell.

In one embodiment, the input-regulating element is a hysteretic voltage comparator, the characteristic that is related to the photovoltaic cell voltage and current is the switching frequency of the output wave form of the hysteretic voltage comparator and the current of the photovoltaic cell is determined using the photovoltaic cell voltage measured in step (b) and the relationship between the switching frequency of the output wave form of the hysteretic voltage comparator and the photovoltaic cell voltage and current.

Preferably, the power converter interfaces with a microcontroller for performing the MPPT. In one such embodiment in which the photovoltaic cell is connected to a power converter that interfaces with a microcontroller for performing the MPPT, the power converter has a circuit comprising:

(i) first and second input terminals for connection to the photovoltaic cell providing an input voltage;
(ii) a capacitor having a first terminal connected to the first input terminal and a second terminal connected to the second input terminal;
(iii) said hysteretic voltage comparator having at least three terminals, wherein a first terminal is an input terminal connected to the first terminal of the capacitor, a second terminal is an input terminal for inputting a reference voltage that sets the voltage at which the photovoltaic cell operates and a third terminal is an output terminal;
(iv) a switch having a first terminal connected to the third terminal of the hysteretic voltage comparator to thereby receive the output signal from the hysteretic voltage comparator, a second terminal connected to the second terminal of the capacitor and a third terminal, whereby the output signal from the hysteretic voltage comparator serves to open and close the switch such that when the voltage on the capacitor exceeds the high threshold voltage of the hysteretic voltage comparator the switch is closed and when the voltage on the capacitor decreases to the low threshold voltage of the hysteretic voltage comparator the switch is open;
(v) an inductor having a first terminal connected to the first terminal of the capacitor and a second terminal connected to the third terminal of the switch;
(vi) an output rectifier having a first terminal connected to the second terminal of the inductor and a second terminal;
(vii) first and second output terminals, wherein the first output terminal is connected to the second terminal of the output rectifier and the second output terminal is connected to the second terminal of the switch; and wherein the microcontroller interfaces with the power converter using three I/O ports, wherein port 1 is connected to the first terminal for connection to the photovoltaic cell and the analog input to port 1 provides a measure of the photovoltaic cell voltage to the microcontroller, port 2 is connected to the output terminal of the hysteretic voltage comparator and the digital input to port 2 provides the output waveform of the hysteretic voltage comparator to the microcontroller, and port 3 is connected to the second terminal of the hysteretic voltage comparator and the analog output of port 3 provides the voltage in step (e) at which the hysteretic voltage comparator operates the photovoltaic cell.

This invention also provides a method for Maximum Power Point Tracking (MPPT) multiple photovoltaic cells by a power combiner that combines the output power of the multiple photovoltaic cells into a single output, the power combiner comprising a parallel arrangement of multiple circuits, wherein a different one of the multiple circuits is allocated to each of the multiple photovoltaic cells and wherein each of these circuits is a complete power converter circuit or forms a complete power converter circuit when connected to one or more shared elements that these circuits share, the method comprising, for each of the multiple photovoltaic cells:

(a) connecting the photovoltaic cell to its allocated circuit containing an input-regulating element that has an output wave form with a characteristic that is related to the photovoltaic cell voltage and current and determining the relationship between the characteristic of the output wave form and the photovoltaic cell voltage and current;
(b) directly measuring the photovoltaic cell voltage;
(c) using the photovoltaic cell voltage measured in step (b) and the relationship between the characteristic of the output wave form of the input-regulating element of the allocated power converter and the photovoltaic cell voltage and current to determine the photovoltaic cell current;
(d) using the photovoltaic cell voltage measured in step (b) and the photovoltaic cell current determined in step (c) in a MPPT algorithm to determine the voltage at which the input-regulating element of the allocated circuit should operate the photovoltaic cell to achieve MPPT; and
(e) adjusting the voltage at which the input-regulating element of the allocated circuit is operating the photovoltaic cell to the level determined in step (d).

Preferably, the method further comprises, for each of the multiple photovoltaic cells:

(f) repeating steps (b) through (e) to maintain MPPT during the operation of the photovoltaic cell.

In one embodiment, the input-regulating element in each of the multiple circuits is a hysteretic voltage comparator that has an output wave form the switching frequency of which is related to the photovoltaic cell voltage and current and the current of the photovoltaic cell is determined using the photovoltaic cell voltage measured in step (b) and the relationship between the switching frequency of the output wave form of the hysteretic voltage comparator and the photovoltaic cell voltage and current.

Preferably, each of the multiple circuits interfaces with a microcontroller for performing MPPT.

In one embodiment wherein each of the multiple circuits allocated to the various photovoltaic cells is a complete power converter circuit, all the power converter circuits are identical. For example, each power converter circuit may be the one described in detail above. In another embodiment, the power converter circuits are not identical.

For the embodiments wherein each of the multiple circuits allocated to the various photovoltaic cells share one or more elements with the other circuits in order to form a complete power converter circuit, no more than one circuit is connected to the one or more shared elements at any given time.

The method for MPPT is useful with photovoltaic cells, particularly solar cells, that are operating under variable irradiance and temperature conditions. The method for MPPT multiple photovoltaic cells by a power combiner is useful when the solar cell unit is comprised of multiple like-type cells and multiple cells of different types.

DETAILED DESCRIPTION OF THE PREFERRED EMBODIMENTS

The method of MPPT of a photovoltaic cell by a power converter is applicable when the power converter is a lone power converter MPPT a single photovoltaic cell and when the power converter is one of two or more power converters in a power combiner wherein each power converter is MPPT a photovoltaic cell to which it is allocated.

In order to obtain maximum output power from the power converter it is necessary to operate the photovoltaic cell at its MPP. To do this it is necessary to know the voltage and current at which the photovoltaic cell is operating and then use one of the various algorithms that have been developed (see, e.g., T. Esram And P. L. Chapman, IEEE Transaction on Energy Conversion, Vol. 22, Issue 2, 439-449 2007) to locate and track the MPP and operate the photocell at that point. Typically this means having sensors to directly measure both the voltage and current at which the photovoltaic cell is operating. The instant MPPT method operates without the need to directly measure the photovoltaic cell current. Instead, the current is indirectly determined by using a characteristic of the output waveform of the input-regulating element of the power converter. The characteristic is related to the photovoltaic cell current and voltage. The current is determined by using the relationship between that characteristic and the photovoltaic cell current and voltage and the directly measured voltage. This eliminates the need for the usually more bulky and expensive current sensor.

In one embodiment, the input-regulating element is a hysteretic voltage comparator. The characteristic of the output wave form of the hysteretic voltage comparator that is related to the photovoltaic cell voltage and current is its switching frequency. The current of the photovoltaic cell is determined using the measured photovoltaic cell voltage and the relationship between the switching frequency of the output wave form of the hysteretic voltage comparator and the photovoltaic cell voltage and current.

Figure 1:
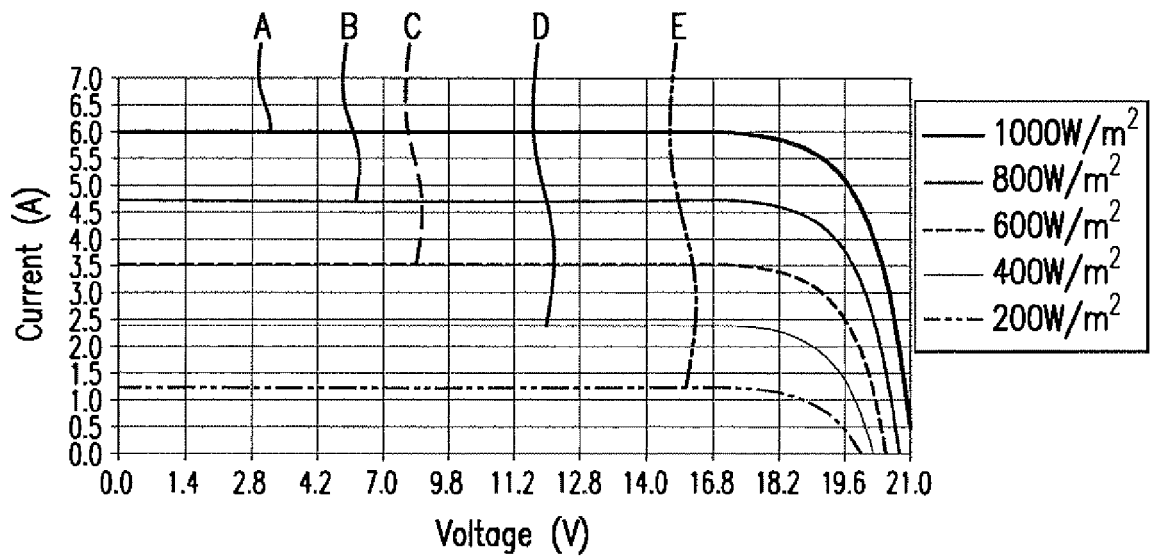
FIG. 1 shows typical plots of photovoltaic cell current versus cell voltage for various incident radiation.
Figure 2:
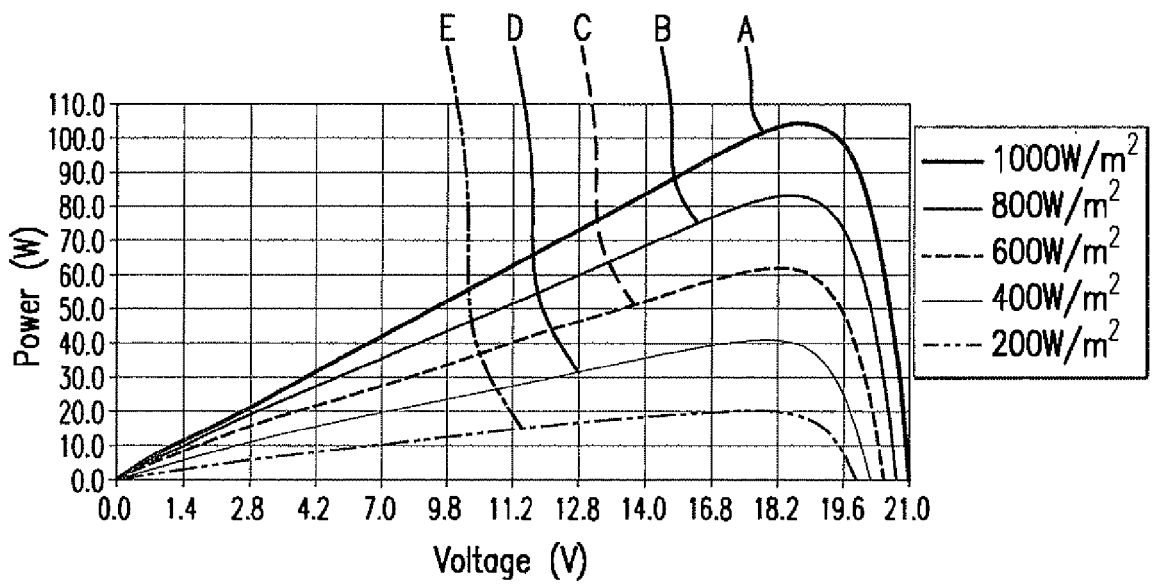
FIG. 2 shows typical plots of photovoltaic cell power versus cell voltage for various incident radiation.
Figure 3:
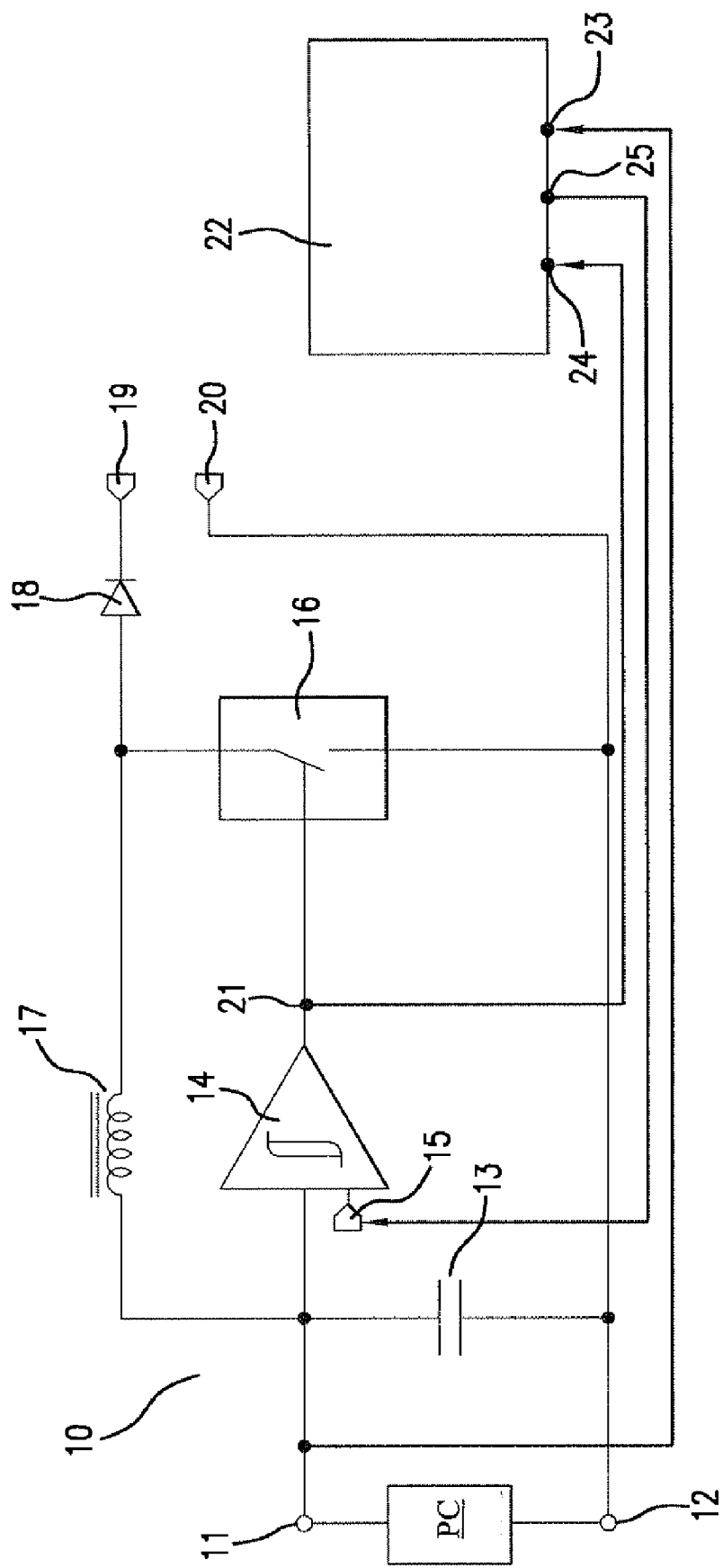
FIG. 3 is a schematic diagram of one embodiment of the power converter that can be used in the instant method.

The method for MPPT a photovoltaic cell by a power converter with an input-regulating element that is a hysteretic voltage comparator can be illustrated using the particular power converter circuit shown in FIG. 3. Any power converter with an input-regulating element that has an output wave form with a characteristic that is related to the photovoltaic cell voltage and current can also be used in the instant method. As shown in FIG. 3, the photovoltaic cell is connected to a power converter that interfaces with a microcontroller for performing MPPT. The power converter has a circuit 10 comprising the following elements. A first input terminal 11 and a second input terminal 12 provide for connection to the photovoltaic cell PC. A capacitor 13 has a first terminal connected to the first input terminal and a second terminal connected to the second input terminal. A hysteretic voltage comparator 14 has a first terminal connected to the first terminal of the capacitor, a second terminal 15 for inputting a reference voltage and a third terminal 21 that is an output terminal. Switch 16 has a first terminal connected to the third terminal of the hysteretic voltage comparator 14 to thereby receive the output signal from the hysteretic voltage comparator 14. The output signal from the hysteretic voltage comparator 14 serves to open and close the switch 16. The switch 16 also has a second terminal connected to the second terminal of the capacitor and a third terminal. An inductor 17 has a first terminal connected to the first terminal of the capacitor 13 and a second terminal connected to the third terminal of the switch 16. An output rectifier 18 has a first terminal connected to the second terminal of the inductor 17 and a second terminal connected to the first output terminal 19. The second output terminal 20 is connected to the second terminal of the switch 16. Preferably, the second input terminal, the second terminal of the capacitor, the second terminal of the switch and the second output terminal are all connected to ground.

This power converter operates in the following fashion. The photovoltaic cell PC charges the capacitor 13 until the voltage on capacitor 13 exceeds the high threshold voltage of hysteretic voltage comparator 14. This causes hysteretic voltage comparator 14 to close switch 16 and "bleed off" current when excess voltage is accumulated across the photovoltaic cell. An increasing current flows from capacitor 13 through the inductor 17 and switch 16 to ground, discharging the energy from capacitor 13 and storing it in the magnetic field of inductor 17. When the voltage on capacitor 13 has fallen to the low threshold voltage of hysteretic voltage comparator 14, the switch 16 is opened. The energy stored in the inductor 17 acts as a current source and raises the voltage at output rectifier 18 until it surpasses the level at the output terminal 19. Current flows through the output rectifier 18 and out of the converter through output terminal 19. When the energy stored in inductor 17 is exhausted, the rectifier ceases conduction and the power converter is returned to its original state. The cycle repeats when capacitor 13 is again charged to a sufficient level. The voltage at the output terminal is greater than the voltage of the power source at the input terminal.

The circuit elements can take various forms. The capacitor 13 can be a single capacitor or two or more capacitors arranged in parallel and/or series configurations. The hysteretic voltage comparator 14 can be comprised of a commercially available externally referenced integrated circuit comparator or a self-referencing circuit. The switch 16 can be comprised of a bipolar transistor or a field effect transistor and resistors to set the high and low switching threshold voltages. The inductor 17 can be a single inductor or coupled inductors to provide further flexibility in operational range. A flyback converter can be used with a transformer in place of the inductor 17 and the output rectifier connected to the secondary winding of the transformer. The output rectifier 18 can be in form of a diode or, if pulse outputs are not desired, the pulses can be easily filtered to DC by using a capacitor in conjunction with the diode. Alternatively, a synchronous rectifier structure can be used in place of the diode. In another variation a flyback converter can be used in place of the inductor 17. Other forms for these elements will be apparent to those skilled in the art.

Figure 4:
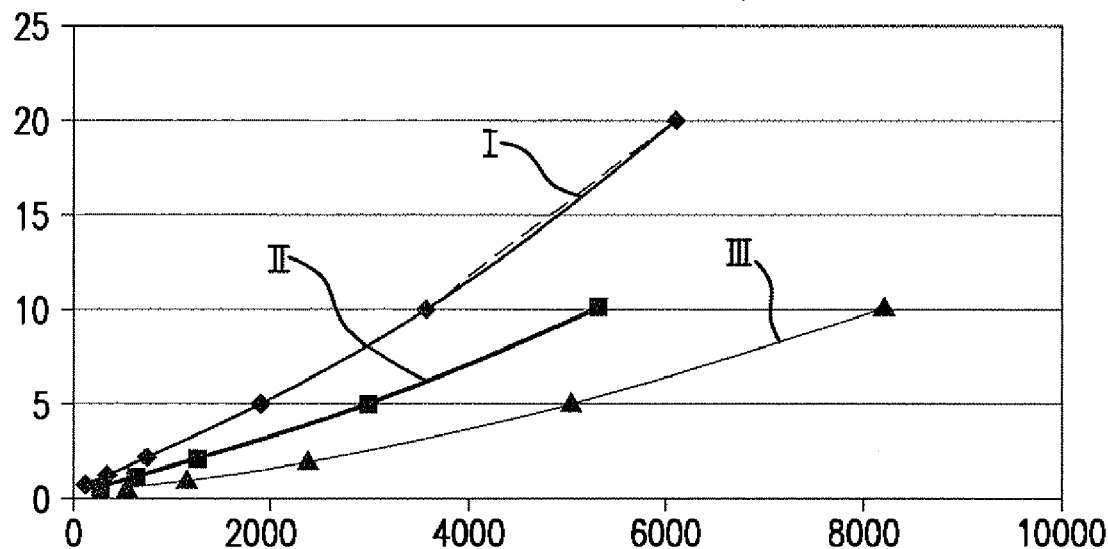
FIG. 4 is a plot of the switching frequency of the hysteretic voltage comparator shown in the circuit of FIG. 3 versus photovoltaic cell current with photovoltaic cell voltage held constant.
Figure 5:
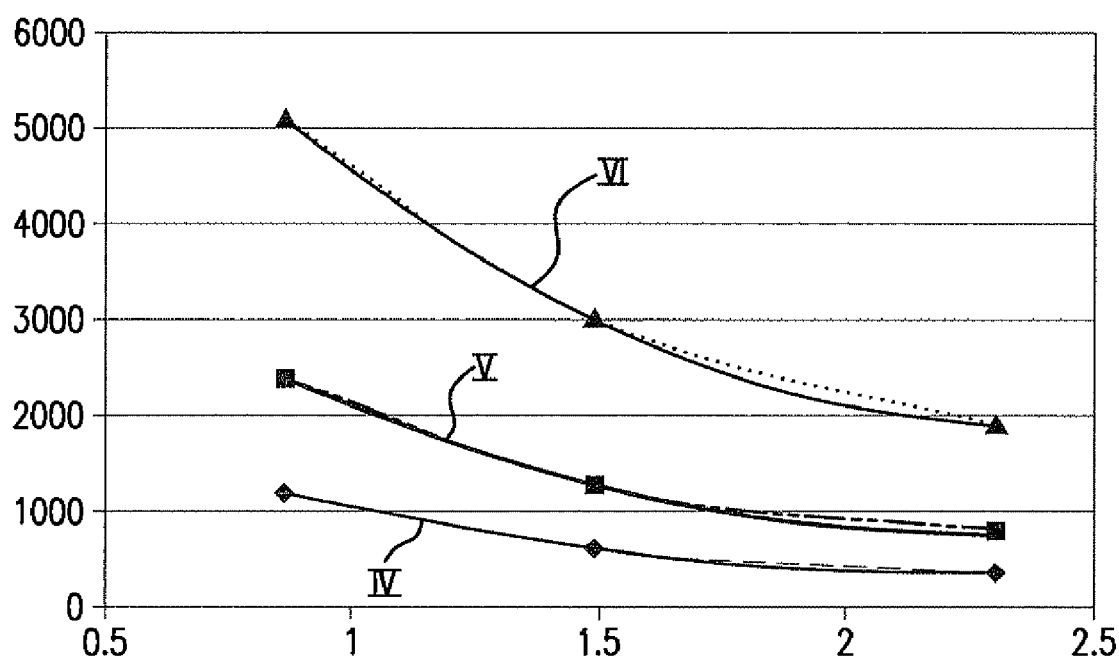
FIG. 5 is a plot of photovoltaic cell voltage versus the switching frequency of the hysteretic voltage comparator shown in the circuit of FIG. 3 with photovoltaic cell current held constant.

As described, the hysteretic voltage comparator 14 toggles the switch 16 on and off. At high levels of irradiance, e.g., in the case of a solar cell on a sunny day, the switch is toggled relatively quickly. At low levels of irradiance, e.g., in the case of the same solar cell on a cloudy day, the switch is toggled at a slower rate. Operation of the power converter shown in FIG. 3 was simulated to determine the relationship between the switching frequency of the output wave form hysteretic voltage comparator and the photovoltaic cell voltage and current The results are shown in FIGS. 4 and 5. FIG. 4 is a plot of switching frequency (x-axis in Hertz) versus cell current (y-axis in milliAmperes) with cell voltage held constant. The three curves correspond to cell voltages of I—2.3V, II—1.487V and III—0.868V. These curves show that increasing cell current results in higher switching frequency when the cell voltage is held constant. FIG. 5 is a plot of cell voltage (x-axis in Volts) versus switching frequency (y-axis in Hertz) with cell current held constant. The three curves correspond to cell currents of IV—1 mA, V—2 mA and VI—3 mA. These curves show that increasing cell voltage results in lower switching frequency when the cell current is held constant.

FIG. 3 also shows the microcontroller that interfaces with the power converter for performing MPPT. The microcontroller 22 interfaces with the power converter using three I/O ports. The first port 23 is connected to the first terminal for connection to the photovoltaic cell, input terminal 11 and the analog input to port 23 provides a measure of the photovoltaic cell voltage to the microcontroller 22. The second port 24 is connected to the output terminal 21 of the hysteretic voltage comparator 14 and the digital input to port 24 provides the output waveform of the hysteretic voltage comparator to the microcontroller. The third port 25 is connected to the second terminal 15 of the hysteretic voltage comparator 14 and the analog output of port 25 provides the voltage in step (e) of the method at which the hysteretic voltage comparator 14 operates the photovoltaic cell PC.

The method of MPPT can be implemented in various ways. One possible implementation follows. When the photovoltaic cell PC is connected to the input terminals 11 and 12 and power supplied to the power converter 10 and microcontroller 22, the microcontroller 22 sets the analog output voltage of port 25 at some reasonable predetermined value to input to terminal 15 of the hysteretic voltage comparator 14. As an example, for operation with a single silicon solar cell, a value of 0.35 Volts would be a reasonable initial value. The microcontroller 22 measures the solar cell voltage using the analog input to port 23 and determines the switching frequency of the output wave form of the hysteretic voltage comparator 14 using the digital input to port 24. Using the relationship between the switching frequency and the solar cell voltage and current, the microcontroller can determine the current output of the solar cell and, from the voltage and current, the power output of the solar cell. The microcontroller then perturbs the analog output voltage of port 25 and uses the new inputs to ports 23 and 24 to determine new values for the solar cell voltage and current and tracks how the output power changes as the analog output voltage of port 25 is perturbed. One of the various MPPT algorithms mentioned above can then be applied by the microcontroller to locate and track an operating point that produces maximum power output.

The relationship between the output wave form of the input-regulating element and the photovoltaic cell voltage and current can be determined when the particular photovoltaic cell to be used with the power converter is connected to the power converter for actual use and the data supplied to the microcontroller. Alternatively, the relationship can be determined at a time prior to use either using the particular photovoltaic cell and power converter that are to be paired. When many pairs of like photovoltaic cells and like power converters are being paired, representative samples of each can be used to established the relationship.

A power combiner can be used to provide the single output with the power from one or more photovoltaic cells. The power combiner can be used to combine the power from photovoltaic cells that are alike or different. For example when used with multiple like-type photovoltaic cells the power combiner can be used to combine the power from individual cells or from parallel or series combinations of these cells. A power combiner is especially useful when combining the outputs of photovoltaic cells that are not alike, e.g., when combining the power from multiple cells wherein the cells are of different types. The various cells can be chosen so that each converts different ranges of the solar spectrum and thereby provides more efficiency. For MPPT, the voltage across each cell must be regulated at a particular temperature-compensated value to provide optimum operation of that cell.

This invention also provides a method for MPPT multiple photovoltaic cells by a power combiner that combines the output power of the multiple photovoltaic cells into a single output, the power combiner comprising a parallel arrangement of multiple circuits, wherein a different one of the multiple circuits is allocated to each of the multiple photovoltaic cells and wherein each of these circuits is a complete power converter circuit or forms a complete power converter circuit when connected to one or more shared elements that these circuits share. When elements are shared, no more than one circuit is connected to the shared elements at any given time.

The power combiner is comprised of multiple circuits, wherein a different one of the circuits is allocated to each of the multiple power sources For example, if there are n power sources there will be n circuits, one for each of the power sources. The multiple circuits can be different or identical. As used herein "identical circuits" indicates that the circuits have the same components. Even though the components are the same, their values and the operation of the circuits can differ, e.g., the hysteretic voltage comparators internal or external reference voltages can be different in order to achieve MPPT.

The method for MPPT multiple photovoltaic cells by a power combiner in which each of the multiple circuits is a complete power converter circuit with an input-regulating element that is a hysteretic voltage comparator can be illustrated using the particular power converter circuit shown in FIG. 3. This embodiment is shown schematically in FIG. 6 wherein each of the multiple power converter circuits interfaces with a microcontroller for performing MPPT. For simplicity, the power combiner 40 is shown with only two photovoltaic cells and two power converter circuits, but any number can be used. In addition, both circuits interface with the same microcontroller. Comparable circuit elements are labeled with the same numbers used for the schematic drawing of FIG. 3. In each circuit the second input terminal 12A or 12B, the second terminal of the capacitor and the second terminal of the switch are all connected to ground. The second output terminal 20C is accordingly connected to ground. Photovoltaic cell PCA is connected to power converter circuit 10A using input terminal 11A and ground terminal 12A. The various circuit elements capacitor 13A, voltage comparator 14A with terminal 15A for inputting a reference voltage and output terminal 21A, switch 16A, inductor 17A and output rectifier 18A all are connected as described previously for the power converter shown in FIG. 3 and the circuit 10A operates in the manner described previously. Photovoltaic cell PCB is connected to power converter circuit 10B using input terminal 11B and ground terminal 12B. Power converter circuit 10B has the same elements and terminals, i.e., 13B through 18B and 21B, as power converter circuit 10A. They all are also connected as described previously for the power converter shown in FIG. 3 and the circuit 10B operates in the manner described previously. The second terminal of the output rectifier of each power converter circuit is connected to the common output terminal 19C and current flows out of the output rectifier of each of the power converter circuits and out of the power combiner through output terminal 19C.

Figure 6:
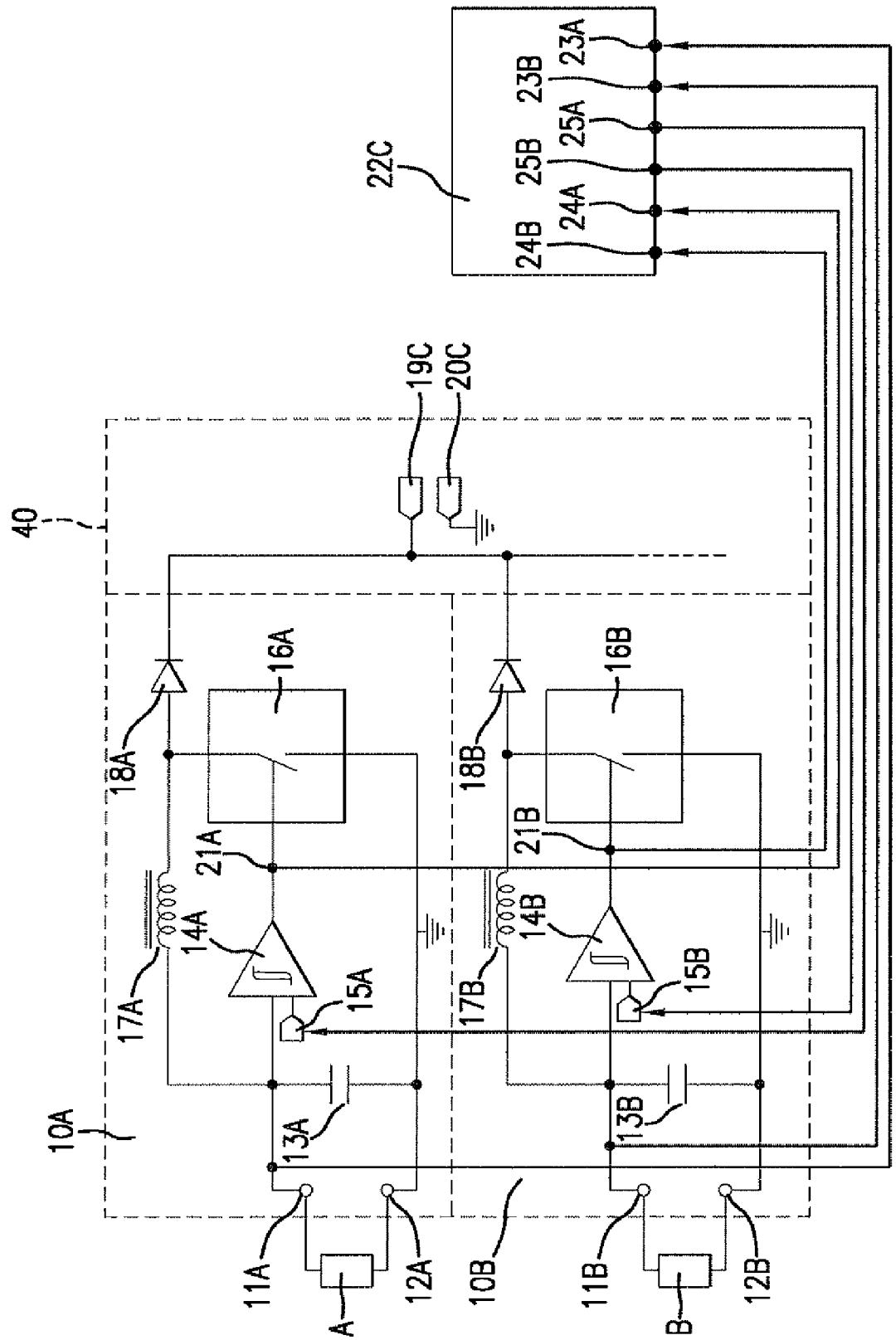
FIG. 6 is a schematic diagram of one embodiment of the power combiner that can be used in the instant method.

FIG. 6 also shows the microcontroller that interfaces with the power combiner for performing MPPT of the two photoelectric cells. The microcontroller 22C interfaces with each of the power converter circuits of the power combiner using six I/O ports, three I/O ports for each of the power converter circuits. The first port 23A for power converter 10A is connected to the first terminal for connection to the photovoltaic cell, input terminal 11A, and the analog input to port 23A provides a measure of the photovoltaic cell PCA voltage to the microcontroller 22C. The second port 24A is connected to the output terminal 21A of the hysteretic voltage comparator 14A and the digital input to port 24A provides the output waveform of the hysteretic voltage comparator 14A to the microcontroller. The third port 25A is connected to the second terminal 15A of the hysteretic voltage comparator 14A and the analog output of port 25A provides the voltage in step (e) of the method at which the hysteretic voltage comparator 14A operates the photovoltaic cell PCA. The three ports 23B, 24B and 25B are similarly connected to 11B, 21B and 15B, respectively, for the same purposes.

FIG. 6 shows a single microcontroller 22C providing MPPT for each of the two photovoltaic cells in a manner as described above for the photovoltaic cell connected to a power converter. The microcontroller performs MPPT for photovoltaic cell PCA and then for photovoltaic cell PCB and then repeats the process alternately providing MPPT for the two cells in a round-robin method. A single microcontroller can perform MPPT on more than one photovoltaic cell, or more than one group of like cells, using such a round-robin method, i.e., addressing each in turn. To provide MPPT for n photovoltaic cells, the microcontroller requires 3n ports to accommodate n analog inputs, n digital inputs and n analog outputs from the n power converter circuits. As the number of cells, or groups of cells, being tracked increases, the MPPT speed of any one photovoltaic cell decreases. Multiple microcontrollers can be used to increase MPPT speed; however, using fewer microcontrollers, and particularly a single microcontroller, is attractive because it reduces system cost.

The method for MPPT multiple photovoltaic cells by a power combiner can also be used with a power combiner in which the multiple circuits allocated to the various photovoltaic cells are not complete power converter circuits but rather share one or more elements. The circuits may be different or identical. When a circuit is connected to the one or more shared elements, the circuit and the shared elements form a complete input-regulating high-output impedance power converter circuit. No more than one circuit is connected to the shared elements at any given time, The same microcontroller that performs MPPT can periodically cycle through and connect and disconnect the circuits to the shared elements and thereby simultaneously process each of the photovoltaic cells and provide MPPT for each of the photovoltaic cells.

As used herein, "input-regulating" has its usual meaning, i.e., the power converter senses the input voltage and maintains it at a certain level.

As used herein, "high output impedance" has its usual meaning, i.e., the output looks like a current source.

What is claimed is:

1. A method for Maximum Power Point Tracking (MPPT) a photovoltaic cell by a power converter that converts the power provided by the photovoltaic cell and provides an output current at an output voltage that is greater than and not dependent on the input voltage, said method comprising:
   (a) connecting the photovoltaic cell to a power converter containing an input-regulating element that has an output wave form with a characteristic that is related to the photovoltaic cell voltage and current and determining the relationship between the characteristic of the output wave form and the photovoltaic cell voltage and current, wherein said input regulating element is a hysteretic voltage comparator;
   (b) directly measuring the photovoltaic cell voltage;
   (c) using the photovoltaic cell voltage measured in step (b) and the relationship between said characteristic of the output wave form of the input-regulating element and the photovoltaic cell voltage and current to determine the photovoltaic cell current,
   (d) using the photovoltaic cell voltage measured in step (b) and the photovoltaic cell current determined in step (c) in a MPPT algorithm to determine the voltage at which the input-regulating element should operate the photovoltaic cell to achieve MPPT; and
   (e) adjusting the voltage at which the input-regulating element is operating the photovoltaic cell to the level determined in step (d).

2. The method of claim 1, further comprising:
   (f) repeating steps (b) through (e) to maintain MPPT during the operation of the photovoltaic cell.

3. The method of claim 1, wherein said characteristic that is related to the photovoltaic cell voltage and current is the switching frequency of the output wave form of the hysteretic voltage comparator and wherein the current of the photovoltaic cell is determined using the photovoltaic cell voltage measured in step (b) and the relationship between the switching frequency of the output wave form of the hysteretic voltage comparator and the photovoltaic cell voltage and current.

4. The method of claim 2, wherein said characteristic that is related to the photovoltaic cell voltage and current is the switching frequency of the output wave form of the hysteretic voltage comparator and wherein the current of the photovoltaic cell is determined using the photovoltaic cell voltage measured in step (b) and the relationship between the switching frequency of the output wave form of the hysteretic voltage comparator and the photovoltaic cell voltage and current.

5. The method of claim 3, wherein said power converter interfaces with a microcontroller for performing the MPPT.

6. The method of claim 4, wherein said power converter interfaces with a microcontroller for performing the MPPT.

7. The method of claim 5, wherein the power converter has a circuit comprising:
   (i) first and second input terminals for connection to the photovoltaic cell providing an input voltage;
   (ii) a capacitor having a first terminal connected to the first input terminal and a second terminal connected to the second input terminal;
   (iii) said hysteretic voltage comparator having at least three terminals, wherein a first terminal is an input terminal connected to the first terminal of the capacitor, a second terminal is an input terminal for inputting a reference voltage that sets the voltage at which the photovoltaic cell operates and a third terminal is an output terminal;
   (iv) a switch having a first terminal connected to the third terminal of the hysteretic voltage comparator to thereby receive the output signal from the hysteretic voltage comparator, a second terminal connected to the second terminal of the capacitor and a third terminal, whereby the output signal from the hysteretic voltage comparator serves to open and close the switch such that when the voltage on the capacitor exceeds the high threshold voltage of the hysteretic voltage comparator the switch is closed and when the voltage on the capacitor decreases to the low threshold voltage of the hysteretic voltage comparator the switch is open;
   (v) an inductor having a first terminal connected to the first terminal of the capacitor and a second terminal connected to the third terminal of the switch;
   (vi) an output rectifier having a first terminal connected to the second terminal of the inductor and a second terminal;
   (vii) first and second output terminals, wherein the first output terminal is connected to the second terminal of the output rectifier and the second output terminal is connected to the second terminal of the switch; and wherein the microcontroller interfaces with the power converter using three I/O ports, wherein port 1 is connected to the first terminal for connection to the photovoltaic cell and the analog input to port 1 provides a measure of the photovoltaic cell voltage to the microcontroller, port 2 is connected to the output terminal of the hysteretic voltage comparator and the digital input to port 2 provides the output waveform of the hysteretic voltage comparator to the microcontroller, and port 3 is connected to the second terminal of the hysteretic voltage comparator and the analog output of port 3 provides the voltage in step (e) at which the hysteretic voltage comparator operates the photovoltaic cell.

8. The method of claim 6, wherein the power converter has a circuit comprising:
 (i) first and second input terminals for connection to the photovoltaic cell providing an input voltage;
 (ii) a capacitor having a first terminal connected to the first input terminal and a second terminal connected to the second input terminal;
 (iii) said hysteretic voltage comparator having at least three terminals, wherein a first terminal is an input terminal connected to the first terminal of the capacitor, a second terminal is an input terminal for inputting a reference voltage that sets the voltage at which the photovoltaic cell operates and a third terminal is an output terminal;
 (iv) a switch having a first terminal connected to the third terminal of the hysteretic voltage comparator to thereby receive the output signal from the hysteretic voltage comparator, a second terminal connected to the second terminal of the capacitor and a third terminal, whereby the output signal from the hysteretic voltage comparator serves to open and close the switch such that when the voltage on the capacitor exceeds the high threshold voltage of the hysteretic voltage comparator the switch is closed and when the voltage on the capacitor decreases to the low threshold voltage of the hysteretic voltage comparator the switch is open;
 (v) an inductor having a first terminal connected to the first terminal of the capacitor and a second terminal connected to the third terminal of the switch;
 (vi) an output rectifier having a first terminal connected to the second terminal of the inductor and a second terminal;
 (vii) first and second output terminals, wherein the first output terminal is connected to the second terminal of the output rectifier and the second output terminal is connected to the second terminal of the switch; and wherein the microcontroller interfaces with the power converter using three I/O ports, wherein port 1 is connected to the first terminal for connection to the photovoltaic cell and the analog input to port 1 provides a measure of the photovoltaic cell voltage to the microcontroller, port 2 is connected to the output terminal of the hysteretic voltage comparator and the digital input to port 2 provides the output waveform of the hysteretic voltage comparator to the microcontroller, and port 3 is connected to the second terminal of the hysteretic voltage comparator and the analog output of port 3 provides the voltage in step (e) at which the hysteretic voltage comparator operates the photovoltaic cell.

9. A method for Maximum Power Point Tracking (MPPT) multiple photovoltaic cells by a power combiner that combines the output power of the multiple photovoltaic cells into a single output, the power combiner comprising a parallel arrangement of multiple circuits, wherein a different one of the multiple circuits is allocated to each of the multiple photovoltaic cells and wherein each of these multiple circuits is a complete power converter circuit or forms a complete power converter circuit when connected to one or more shared elements that these circuits share, the method comprising, for each of the multiple photovoltaic cells:
 (a) connecting the photovoltaic cell to its allocated circuit containing an input-regulating element that has an output wave form with a characteristic that is related to the photovoltaic cell voltage and current and determining the relationship between the characteristic of the output wave form and the photovoltaic cell voltage and current, wherein said input-regulating element is a hysteretic voltage comparator;
 (b) directly measuring the photovoltaic cell voltage;
 (c) using the photovoltaic cell voltage measured in step (b) and the relationship between the characteristic of the output wave form of the input-regulating element of the allocated power converter and the photovoltaic cell voltage and current to determine the photovoltaic cell current;
 (d) using the photovoltaic cell voltage measured in step (b) and the photovoltaic cell current determined in step (c) in a MPPT algorithm to determine the voltage at which the input-regulating element of the allocated power converter should operate the photovoltaic cell to achieve MPPT; and
 (e) adjusting the voltage at which the input-regulating element of the allocated power converter is operating the photovoltaic cell to the level determined in step (d).

10. The method of claim 9, further comprising, for each of the multiple photovoltaic cells:
 (f) repeating steps (b) through (e) to maintain MPPT during the operation of the photovoltaic cell.

11. The method of claim 9, wherein said characteristic that is related to the photovoltaic cell voltage and current is the switching frequency of the output wave form of the hysteretic voltage comparator and wherein the current of the photovoltaic cell is determined using the photovoltaic cell voltage measured in step (b) and the relationship between the switching frequency of the output wave form of the hysteretic voltage comparator and the photovoltaic cell voltage and current.

12. The method of claim 10, wherein said characteristic that is related to the photovoltaic cell voltage and current is the switching frequency of the output wave form of the hysteretic voltage comparator and wherein the current of the photovoltaic cell is determined using the photovoltaic cell voltage measured in step (b) and the relationship between the switching frequency of the output wave form of the hysteretic voltage comparator and the photovoltaic cell voltage and current.

13. The method of claim 11, wherein each of the multiple circuits interfaces with a microcontroller for performing MPPT.

14. The method of claim 12, wherein each of the multiple circuits interfaces with a microcontroller for performing MPPT.

15. The method of claim 13, wherein each of the multiple circuits is a complete power converter circuit.

16. The method of claim 14, wherein each of the multiple circuits is a complete power converter circuit.

17. The method of claim 13, wherein each of the multiple circuits forms a complete power converter circuit when connected to one or more shared elements that these circuits share and no more than one circuit is connected to the one or more shared elements at any given time.

18. The method of claim 14, wherein each of the multiple circuits forms a complete power converter circuit when connected to one or more shared elements that these circuits share and no more than one circuit is connected to the one or more shared elements at any given time.

\* \* \* \* \*